US006532007B1

(12) United States Patent
Matsuda (10) Patent No.: US 6,532,007 B1
(45) Date of Patent: Mar. 11, 2003

(54) METHOD, APPARATUS AND PRESENTATION MEDIUM FOR MULTIPLE AURAS IN A VIRTUAL SHARED SPACE

(75) Inventor: Satoru Matsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/389,773

(22) Filed: Sep. 3, 1999

(30) Foreign Application Priority Data

Sep. 30, 1998 (JP) .......................................... 10-277063

(51) Int. Cl.[7] .............................................. G06T 15/00
(52) U.S. Cl. ...................................................... 345/419
(58) Field of Search ................................. 345/419, 420, 345/157, 158, 705, 706

(56) References Cited

U.S. PATENT DOCUMENTS 5,872,559 A * 2/1999 Shieh .......................... 345/157

* cited by examiner

Primary Examiner—Phu K. Nguyen
(74) Attorney, Agent, or Firm—Bell, Boyd & Lloyd LLC (57) ABSTRACT

An inner aura and an outer aura each serving as a sensing area, are set for an avatar with the outer aura enclosing the inner aura. Only if an object sensed by the outer aura also exists in the inner aura, is information on the object reported to the avatar. As a result, information presented to an avatar existing in a virtual space is processed at a high speed and the amount of transmitted information is reduced.

51 Claims, 10 Drawing Sheets

METHOD, APPARATUS AND PRESENTATION MEDIUM FOR MULTIPLE AURAS IN A VIRTUAL SHARED SPACE

RELATED APPLICATIONS

This application is related to application entitled: Method, Apparatus And Medium For Describing A Virtual Shared Space Using Virtual Reality Modeling Language (Ser. No. 09/389,812), application entitled: Method, Apparatus And Presentation Medium For Avoiding A Mismatch State In A 3-Dimensional Virtual Shared Space (Ser. No. 09/389,801 ), application entitled: Information Processing Apparatus, Method And Computer Program For Virtual Reality Aura Setting (Ser. No. 09/389,803), application entitled: Information Processing Apparatus, Method And Computer Program For Virtual Reality Transparent Avatars (Ser. No. 09/390, 035), and application entitled: Information Processing Apparatus, Method and Computer Program For Virtual Reality Object Management Using Auras (Ser. No. 09/390, 036), each for the above-referenced applications are assigned to Sony Corporation of Japan, the assignee of the present application, and each of the above-referenced applications concurrently filed herewith, disclosures of which are incorporated herein by reference.

CLAIM TO FOREIGN PRIORITY UNDER 35 USC §119

The present application claims priority to Japanese application No P10-277063 filed on Sep. 30, 1999 in Japan.

BACKGROUND OF THE INVENTION

1. Field of the Invention

The present invention relates to an information processing apparatus, an information processing method and a presentation medium. More particularly, the present invention relates to an information processing apparatus, an information processing method and a presentation medium which increase the speed of information processing and reduce the amount of transmitted data by setting sensing areas for sensing other avatars and other objects in an avatar moving in a virtual space in such a way that an outer sensing area includes an inner sensing area, and processing only an avatar and an object sensed by the outer sensing area which are also sensed by the inner sensing area.

2. Description of the Related Art

A conventional cyberspace service called Habitat® is known in the field of personal computer (PC) communication service such as NIFTY-Serve® and CompuServe® of the U.S. in which a plurality of users connect their PCs to a central host computer through modems and a public telephone-line network to make accesses to the host computer in accordance with a predetermined communication protocol.

Lucas Film of the U.S. started development of the Habitat® in 1985. After an operation of the Habitat® by Quantum Link, a U.S. commercial network company, for approximately 3 years, NIFTY-Serve started a Habitat service as Fujitsu Habitat® in February 1990. In the Habitat®, a parturition of the user which is an object representing the user itself is placed in a virtual city called a Populopolis which is rendered by 2-dimensional graphics, allowing the user to have, among others, a chat with another user. The parturition of the user is referred to as an avatar. More specifically, an avatar is an incarnation of a user which is an object representing the user itself appearing in a virtual environment. The term avatar originates from an Indian myth and refers therein to the incarnation of a Hindu deity. Moreover, in this context, a chat is a real-time conversation based on texts which are displayed on a screen as a result of operations to enter characters via a keyboard. A more detailed description of the Habitat is disclosed in *Cyberspace*, Michael Benedikt edition, an NTT publication ISBN 4-87188-265-9C0010, first edition of Mar. 20, 1994 (which is a translation of *Cyberspace: First Steps,* Michael Benedikt, ed. 1991, MIT Press Cambridge, Mass. ISBN 0-262-02327-X), pages 282 to 307.

In a conventional cyberspace system operated in a PC communication service of this type, a row of houses on a street and rooms in each of the houses in the virtual city are rendered by 2-dimensional graphics such that, in order to move an avatar inward or outward with respect to the background of a 2-dimensional graphic, the avatar is merely moved up and down over the background. That is, the display expression is poor for a pseudo experience of a walk or a movement in the virtual space. In addition, since the virtual space where the avatar representing the user itself and another avatar are displayed, is seen from a perspective of a third person, the sense of a pseudo experience is also lost in this respect.

In order to eliminate the shortcomings described above, a function to display the virtual space by 3-dimensional graphics and to allow the user to walk about in the space with a high degree of freedom as seen from the perspective of the avatar is implemented utilizing a 3-dimensional graphic data descriptive language called Virtual Reality Modeling Language (VRML) as disclosed in pending U.S. patent application Ser. No. 08/678,340 filed Jul. 11, 1996, the disclosure of which is incorporated herein by reference. Details of the VRML are described, for example, in *Knowing VRML: Browsing and Building Cyberspace,* by Mark Pesce and translated by Kohichi Matsuda, Terunao Kamachi, Shoichi Takeuchi, Yasuaki Honda, Junichi Koyomoto, Sadayuki Ishikawa, Ken Miyashita and Kazuhiro Hara, first edition of Mar. 25, 1996, Prentice Hall publication ISBN4-931356-37-0 (which is a translation of *VRML: Browsing & Building Cyberspace,* by Mark Pesce, 1995 New Readers Publishing ISBN 1-56205-498-8), and in *Recent Trends in VRML and CyberPassage,* by Kohichi Matsuda and Yasuaki Honda, bit (Kyoritsu publication)/1996, Vol. 28, No. 7, pages 29 to 36, No. 8, pages 57 to 65, No. 9, pages 29 to 36 and No. 10, pages 49 to 58.

In addition, the specifications of Version 2.0 of the Virtual Reality Modeling Language (ISO/IEC CD 14772) are available at the following URL: http://www.vrml.org/Specifications/VRML2.0/FINAL/spec/index.html. A Japanese version of the specifications is available at the following URL: http://www.webcity.co.ip/info/andoh/VRML/vrml2.0/spec-ip/index.html.

The most recent version of the VRML, VRML2.0 can be used to describe and express an autonomous behavior of an object in a 3-dimensional virtual space. Thus, in a behavior to walk about in a virtual space displayed by 3-dimensional graphics in a browser for VRML2.0, that is, in a 3-dimensional virtual space as seen from the perspective of the avatar, the user is allowed to have a feeling as if the user itself is actually walking about the 3-dimensional virtual space.

A typical browser for VRML2.0 and software for a shared server are a Community Place® Browser/Bureau developed as a product by Sony Corporation, the assignee of the present application. Its prototype β version is available at the following URL: http://vs.sony.co.jp.

When an avatar moves in the virtual space described above, the scenery around the avatar also changes with the movement such that a long time is necessary to process the entire information accompanying the changes in the scenery or, more specifically, to process the information on other avatars and objects. Additionally, difficulty in transmission of all the processed information arises due to the limitation on the amount of data that can be transmitted.

In view of the foregoing, the present invention increases the processing speed and reduces the amount of transmitted data by setting auras (each serving as a sensing area) for an avatar with one of the auras (the outer aura) enclosing the other aura (the inner aura) enclosing the avatar so that only other avatars and objects in the inner aura sensed by the outer aura are to be processed.

SUMMARY OF THE INVENTION

According to one aspect of the present invention, there is provided an information processing apparatus for moving an object located in a 3-dimensional virtual space, the information processing apparatus comprising: recognition means for recognizing another object existing in an outer sensing area used for sensing the other object and set to enclose an inner sensing area set to enclose the object; judgment means for making a judgment as to whether or not the other object recognized by the recognizing means exists in the inner sensing area; and processing means for carrying out predetermined processing on the other object judged by the judgment means to be an object existing in the inner sensing area.

According to another aspect of the present invention, there is provided an information processing method for moving an object located in a 3-dimensional virtual space, the information processing method comprising the steps of: a recognition step of recognizing another object existing in an outer sensing area used for sensing the other object and set to enclose an inner sensing area set to enclose the object; a judgment step of making a judgment as to whether or not the other object recognized at the recognizing means exists in the inner sensing area; and a processing step of carrying out predetermined processing on the other object judged at the judgment means to be an object existing in the inner sensing area.

According to a further aspect of the present invention, there is provided a presentation medium for a presenting a program that can be executed by a computer to drive an information processing apparatus for moving an object located in a 3-dimensional virtual space to carry out processing including: a recognition step of recognizing another object existing in an outer sensing area used for sensing the other object and set to enclose an inner sensing area set to enclose the object; a judgment step of making a judgment as to whether or not the other object recognized at the recognizing means exists in the inner sensing area; and a processing step of carrying out predetermined processing on the other object judged at the judgment means to be an object existing in the inner sensing area.

As a result, according to the present invention, for an object, an inner sensing area (an inner aura) and an outer sensing area (an outer aura) for sensing another object are set with the outer aura enclosing the inner aura which further encloses the object, wherein only if the other object sensed by the outer aura also exists in the inner area, is the processing carried out on the other object. Therefore, in accordance with the present invention, the amount of information reported to the object is reduced and the information is processed in a shorter period of time.

These and other features and advantages of the present invention will be understood upon consideration of the following detailed description of the invention and the accompanying drawings.

DETAILED DESCRIPTION OF THE PREFERRED EMBODIMENTS

Figure 1:
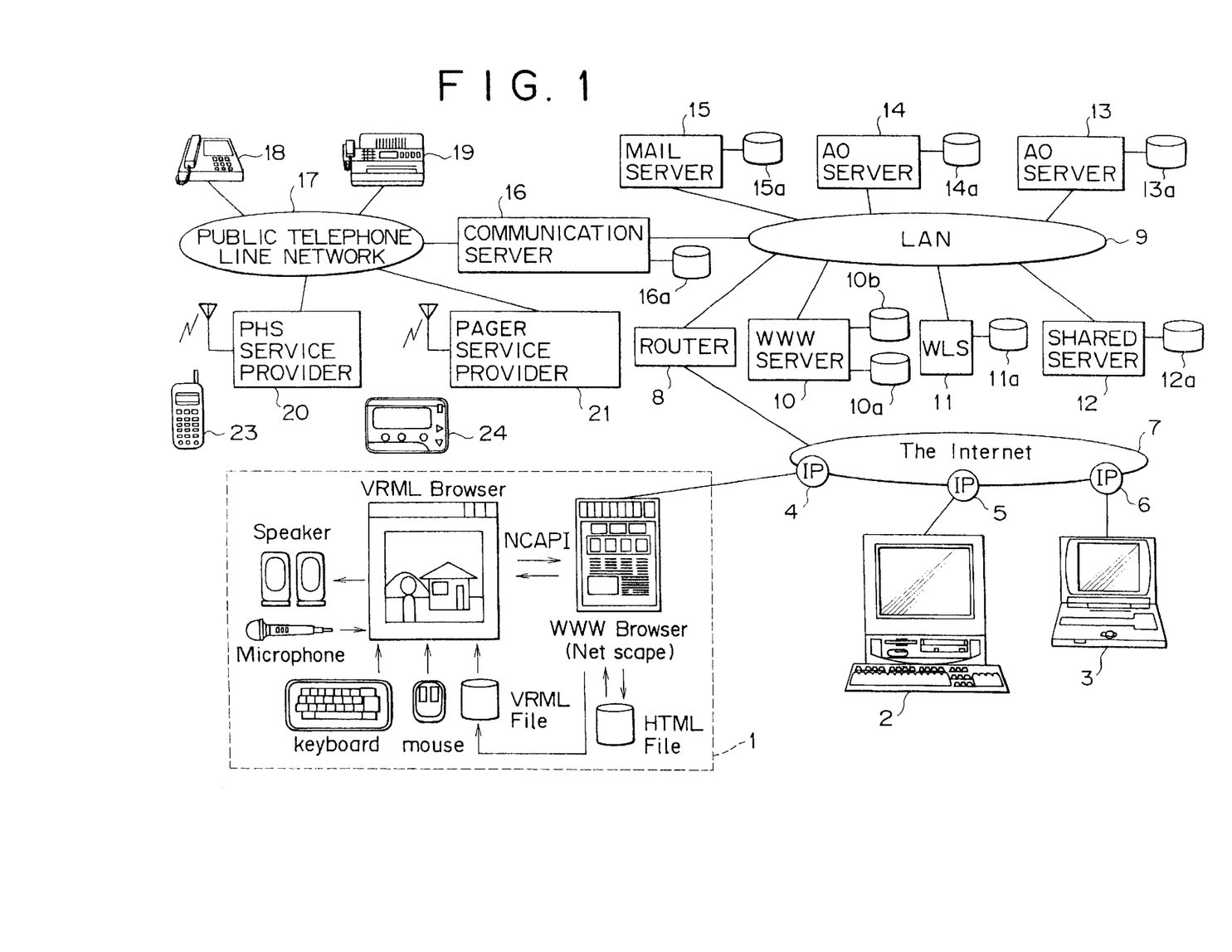
FIG. 1 is a block diagram showing a typical configuration of a shared virtual memory presentation system to which the present invention is applied.

FIG. 1 is a block diagram showing a typical configuration of a shared virtual memory presentation system to which the present invention is applied. It should be noted that the system cited in this specification means an entity obtained as a result of logically putting a plurality of apparatuses in a set without regard to whether or not the apparatuses are physically accommodated in a box.

As shown in FIG. 1, client personal computers (PCs) 1 to 3 are connected to the Internet 7 through Internet connection service providers (IPs) 4 to 6 respectively. In each of the client PCs 1 to 3, a VRML browser and a WWW browser (otherwise generally known as "web browser") are installed for operation.

The client PCs 1 to 3 each have two functions, namely, a 3-D client function and a 2-D client function. The 3-D client function is used to notify a shared server 12, periodically or when necessary, of data such as information on the location of the client PC, and to receive information shared by other 3D objects from shared server 12. On the other hand, the 2-D client function is executed to transmit a request for information to web server 10 in accordance with an HTTP, to receive a response to the request from the web server 10 and to display mainly 2-dimensional information. When a URL is included in information received from shared server 12, the 3-D client function issues a request for an access to the URL to the 2-D client function. Upon this request, the 2-D client function makes an access to the URL (in actuality, to web server 10) to download data such as the shape of an object and pass on the data to the 3-D client function.

A Local Area Network (LAN) 9 is connected to Internet 7 through a router 8. Connected to the LAN 9 are web server 10, a World Location Server (WLS) 11, shared server 12, Application Object (AO) servers 13 and 14, a mail server 15 and a communication server 16. The web server 10 includes hard discs (HDDs) 10a and 10b whereas the other servers 11 to 16 includes HDDs 11a to 16a, respectively.

It should be noted that AO server 13 includes a program for communicating with shared server 12 to present, for example, an application object (AO) such as a robot or an electronic pet which moves autonomously in a virtual space. Much like the 3-D client function, AO server 13 communicates with shared server 12 to report information on itself and to receive information shared by other 3D objects.

The communication server 16 is connected to a telephone 18 or a facsimile 19 through a public telephone switching network 17, in wireless connection to a Personal Handyphone System (PHS) terminal 23 through a PHS service provider 20 and to a pager terminal 24 through a pager service provider 21.

Figure 2:
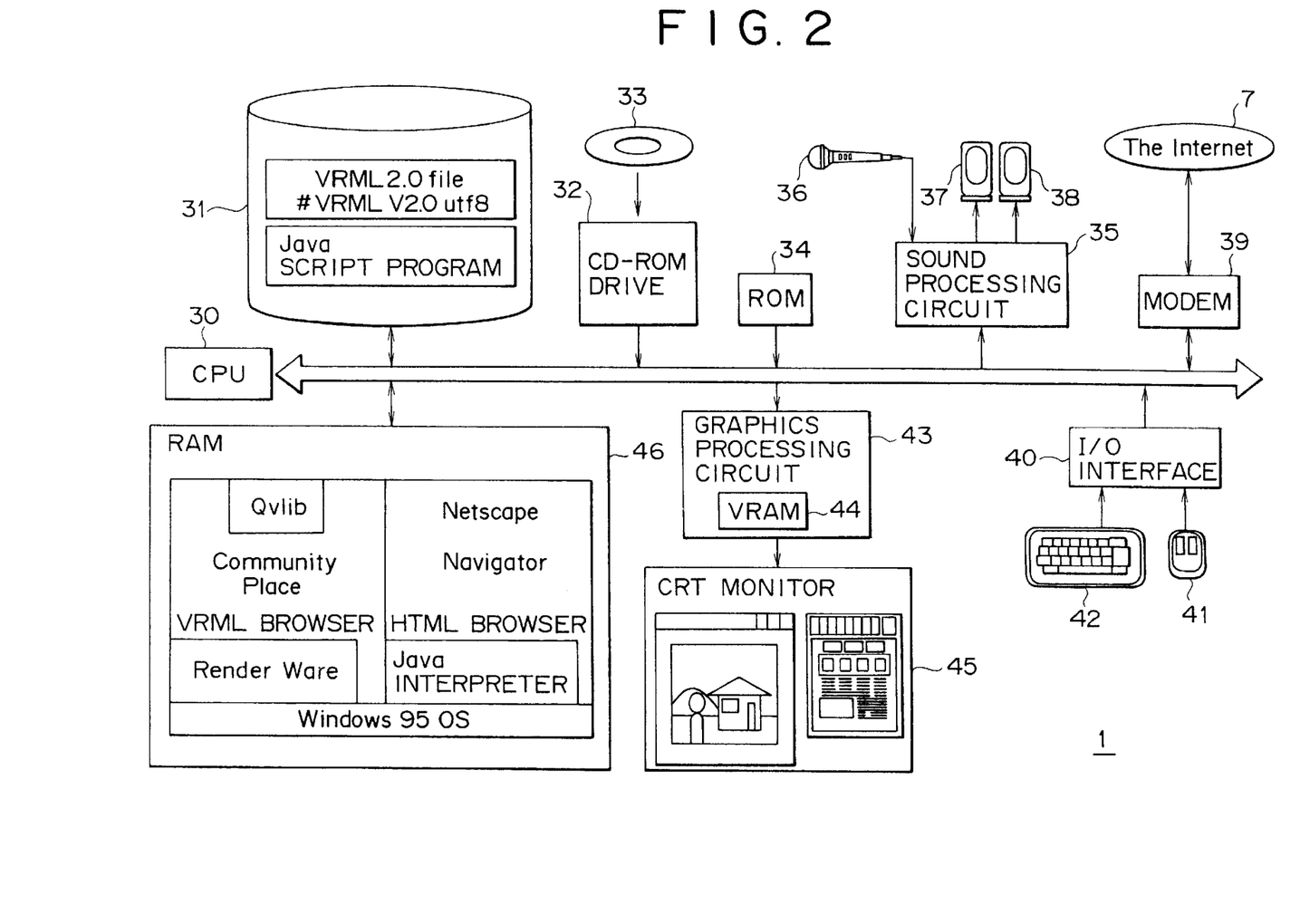
FIG. 2 is a block diagram showing a typical configuration of a client PC 1 employed in the system shown in FIG. 1.

FIG. 2 is a block diagram illustrating a typical configuration of hardware of the client PC 1. In the configuration, a CPU 30 carries out various kinds of processing by executing a program stored in a ROM 34. A storage medium HDD 31 is used for storing, among other information, VRML contents such as VRML2.0 files and predetermined script programs written in Java® language developed by Sun Microsystems, Inc. Additionally, a CD-ROM drive 32 is provided to read out VRML contents stored in a CD-ROM disc 33.

A sound processing circuit 35 is connected to a microphone 36 and right and left speakers 37 and 38, receives sound input from the microphone 36 and outputs sounds such as music and operation messages to speakers 37 and 38. A modem 39 connected to the Internet 7 is used for exchanging data with the Internet 7. An input/output (I/O) interface 40 receives operation signals from a mouse 41 and a keyboard 42 or other equivalent input means. A graphics circuit 43 includes an embedded VRAM 44 for storing picture data completing various kinds of processing. The graphics circuit 43 reads out data from the VRAM 44, outputting the data to a CRT monitor 45 or other equivalent display means.

A web browser such as Netscape Navigator®, a Java interpreter and the Community Place Browsere® are loaded into a RAM 46 to be executed by the CPU 30. The Netscape Navigator® is a web browser configured to operate in Windows 95®, and the Community Place Browser® is a VRML2.0 browser developed by Sony Corporation, the assignee of the present application.

The VRML2.0 browser implements QvLib (which is a library for interpreting the VRML syntax or a purser developed and opened to the public by Silicon Graphics, and RenderWare, or a purser and a renderer having capabilities equivalent to those of QvLib and RenderWare, respectively.

As shown in FIG. 1, the Community Place Browser® exchanges various kinds of data with the Netscape Navigator® serving as a web browser in accordance with a Netscape Client Application Programming Interface® (NCAPI).

The Netscape Navigator® receives an HTML file and VRML contents (including a VRML file and a script program written in Java® language) transmitted by the web server 10 by way of the Internet 7, storing the HTML file and the VRML contents in the local HDD 31. Netscape Navigator® processes the HTML file, displaying a text and a picture obtained as a result of the processing on a CRT monitor 45. On the other hand, the Community Place Browser® processes the VRML file to display a 3-dimensional virtual space on the CRT monitor 45 and changes the behavior of objects in the 3-dimensional virtual space and other display states in accordance with the execution of the script program by the Java® interpreter.

It should be noted that the other client PCs 2 and 3 each have the same configuration as the client PC 1 even though the configurations of the PCs 2 and 3 are not shown explicitly in the figure.

Figure 3:
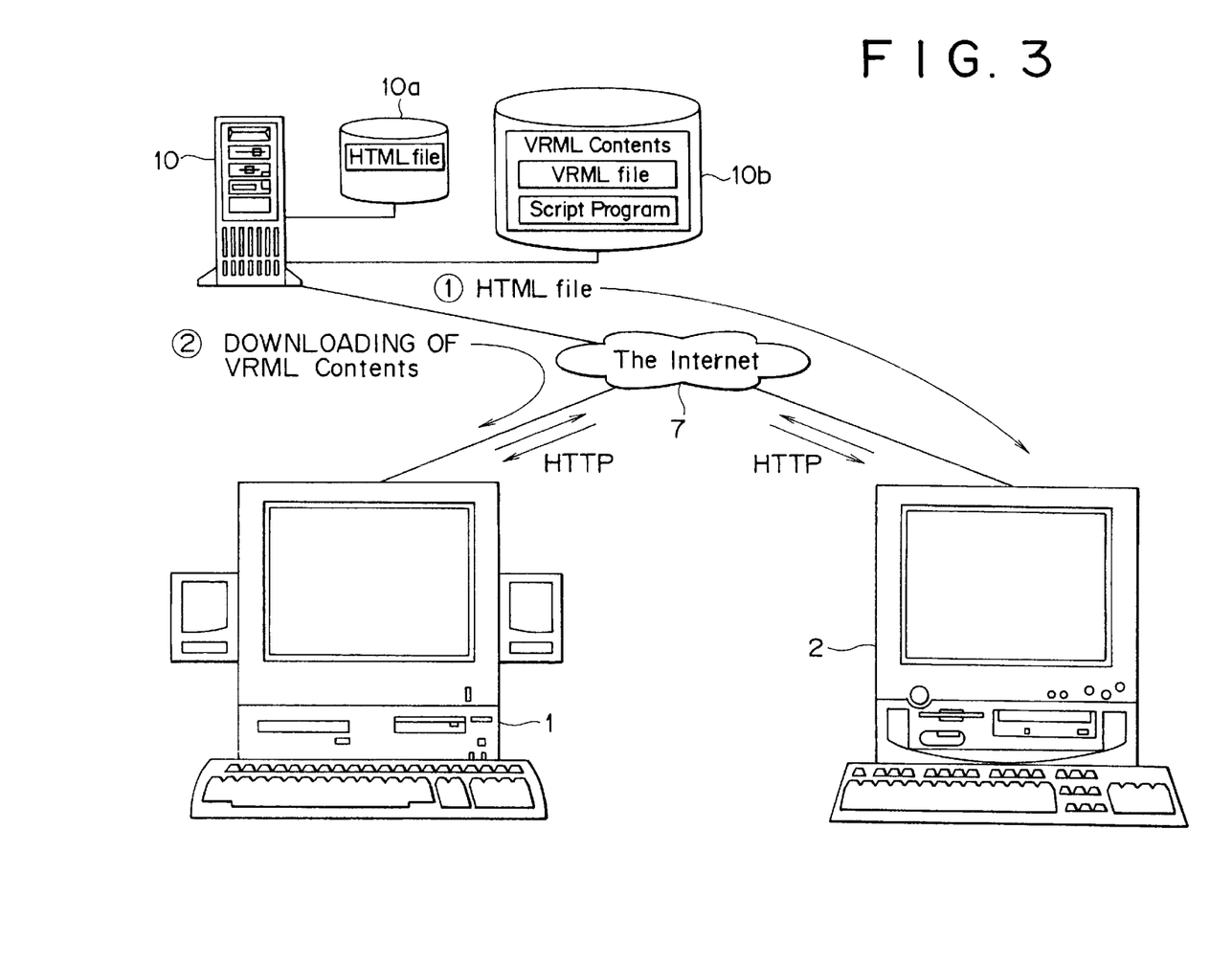
FIG. 3 is an explanatory diagram used for describing the system shown in FIG. 1.

Next, the operation of the embodiment described above is explained by referring to FIGS. 3 to 5. In the state shown in FIG. 3, a home page of a web site providing VRML contents is viewed using the web browser as shown by reference number 1. In this example, the home page is accessed at the following URL: http://pc.sony.co.ip/sapari/. Then, the user of the client PC 1 or 2 downloads VRML contents comprising a VRML2.0 file and a script program written in the Java language to express autonomous motions in a VRML space as shown by reference number 2. Needless to say, VRML contents can also be obtained by having the CD-ROM drive 32 read out the contents from the CD-ROM disc 33.

Figure 4:
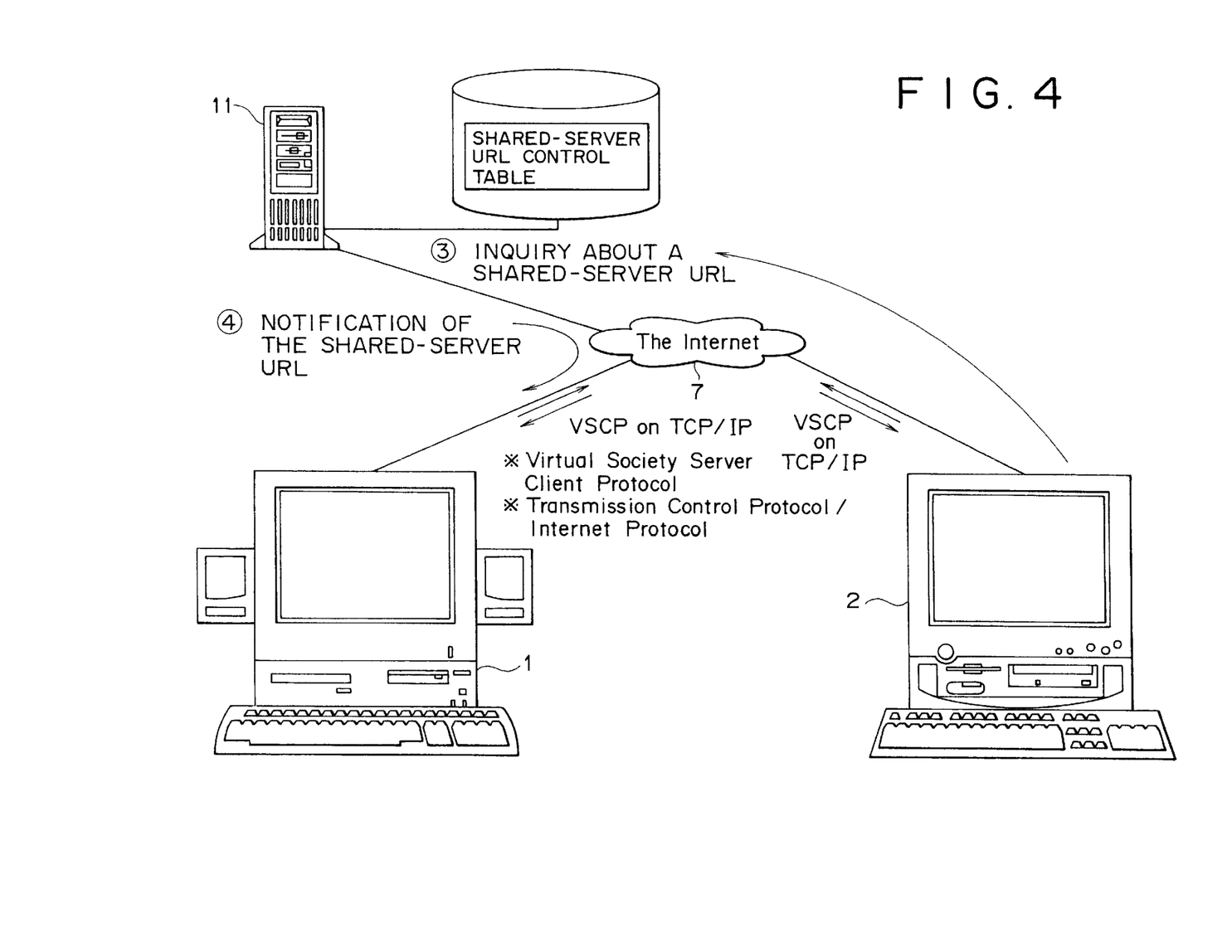
FIG. 4 is an explanatory diagram used for describing the system shown in FIG. 1.

Then, the Community Place Browser® serving as a VRML2.0 browser in the client PC 1 or 2 interprets and executes the VRML2.0 file downloaded and temporarily stored in the local HDD 31 as shown in FIG. 4 and, as indicated by reference number 3, an inquiry regarding the URL of shared server 12 is transmitted to the WLS 11 in accordance with a Virtual Society Server Client Protocol (VSCP). Receiving the inquiry, WLS 11 searches a shared server URL control table stored in the HDD 11a for the URL of shared server 12 and transmits the URL to the client PC 1 or 2 in response to the inquiry as indicated by reference number 4.

Figure 5:
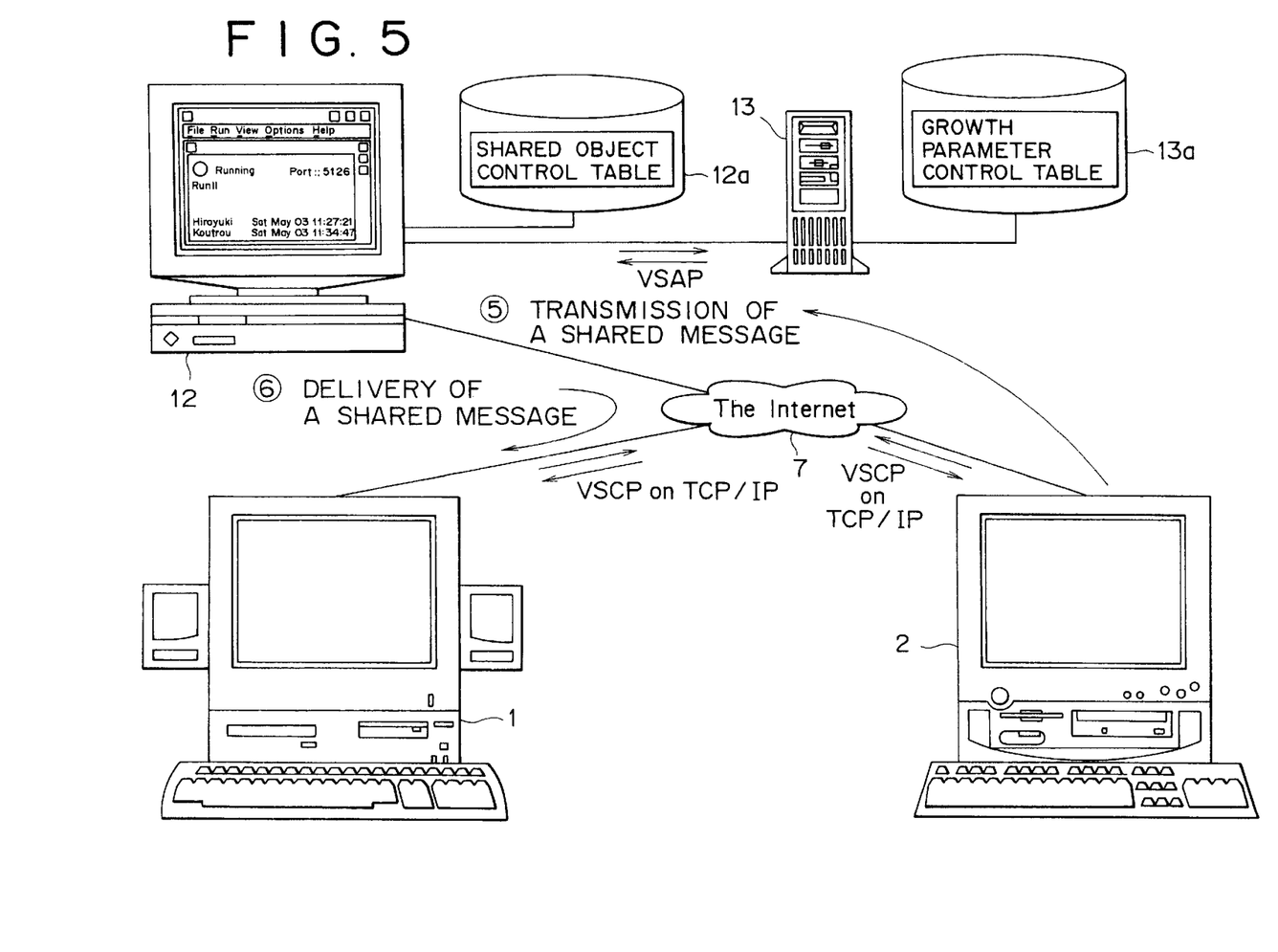
FIG. 5 is an explanatory diagram used for describing the system shown in FIG. 1.

The URL is used to connect the client PC 1 and 2 to shared server 12 as shown in FIG. 5. As a result, a shared message on attributes of a shared 3D object such as the position and the motion thereof is transmitted by way of shared server 12 as indicated by reference number 5 and the shared message is delivered as indicated by reference number 6. In this manner, a multiuser environment is implemented. A detailed description of the above connection procedure is disclosed in pending U.S. patent application Ser. No. 08/678,340 referenced above.

While the 3-dimensional virtual space is used in a multiuser environment in this case, the 3-dimensional virtual space may also be used in an environment other than a multiuser environment. That is, the 3-dimensional virtual space may be used in an environment which is referred to hereafter as a single-user environment for the sake of convenience. In a single-user environment, the avatar of another user is not permitted to appear in the 3-dimensional virtual space and the avatar of this particular user is not permitted to appear in the 3-dimensional virtual space of the client PC of user other than the particular user initiating the pieces of processing indicated by reference numbers 1 and 2. For the sake of convenience, the avatar of another user and the avatar of the particular user are referred to as a drawn avatar and a pilot avatar, respectively. To this end, in order to establish a single-user environment, it is not necessary to carry out the various processes indicated by reference numbers 3 to 6.

Figure 6:
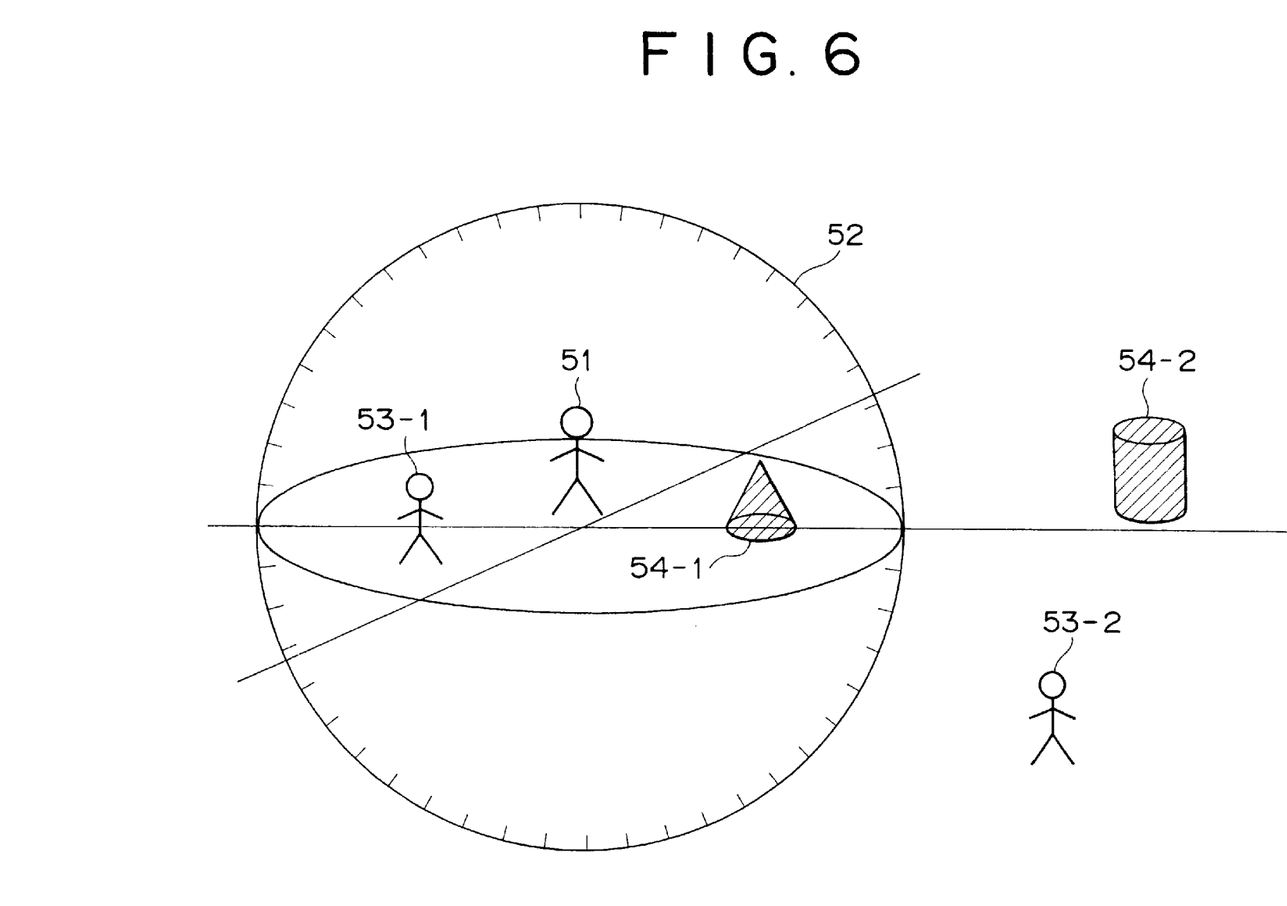
FIG. 6 is an explanatory diagram used for describing an aura.

Next, an aura is explained with reference to FIG. 6. As shown in the figure, an aura 52 with a spherical shape having a predetermined radius is formed around a pilot avatar 51 with the center of the sphere coinciding with pilot avatar 51. The pilot avatar 51 is capable of receiving information from another object located inside the aura 52. That is, pilot avatar 51 is capable of visually recognizing a drawn avatar 53-1 and an application object (AO) 54-1 which are located inside the aura 52. To put it concretely, the pictures of the drawn avatar 53-1 and the object 54-1 are displayed on the CRT monitor of the client PC of the pilot avatar 51. However, pilot avatar 51 is not capable of visually recognizing a drawn avatar 53-2 nor an application object (AO) 54-2 which are located outside the aura 52. Accordingly, in application, the pictures of the drawn avatar 53-2 and the object 54-2 are not displayed on the CRT monitor of the client PC of the pilot avatar 51.

By the same token, an aura is also set for each of the other objects, namely, the drawn avatar 53-1 and object 54-1, drawn avatar 53-2, and object 54-2. In this system, the size of each aura is uniform for all client PCs. It should be noted, however, that the aura of an AO can be set with a size different from the aura of the avatar as desired or necessary.

With aura 52 as described above, it is only necessary for pilot avatar 51 to acquire information from drawn avatar 53-1 and object 54-1, but not from drawn avatar 53-2 and object 54-2 which are located outside aura 52. The amount of information to be received can thus be reduced.

Figure 7:
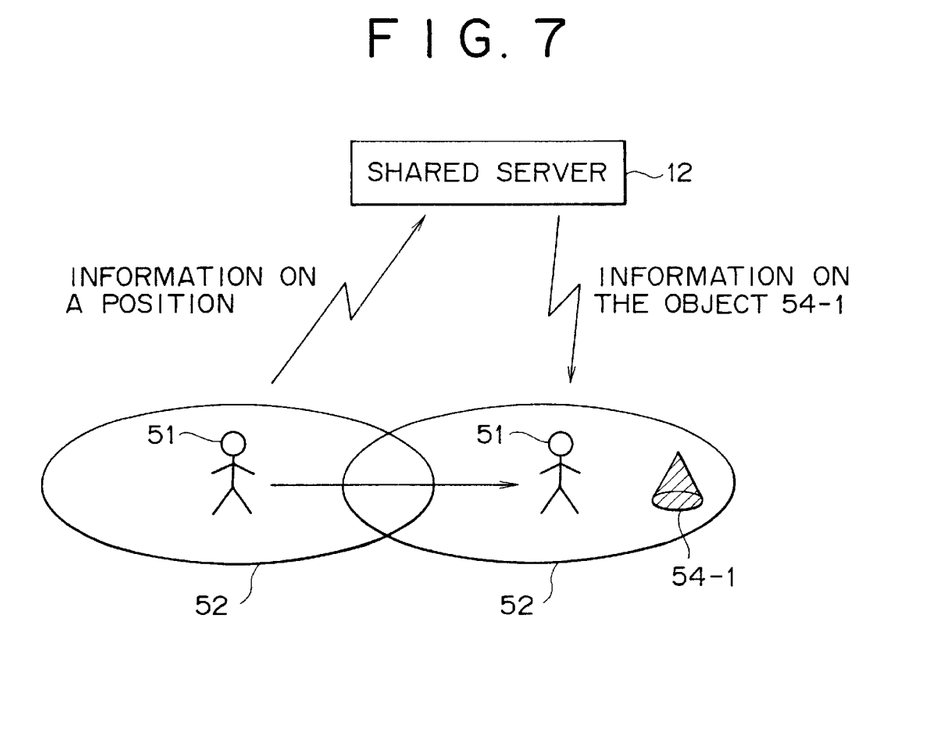
FIG. 7 is an explanatory diagram used for describing sensation of an object by a moving avatar.

Consider an example as shown in FIG. 7. When avatar 51 moves, information on its new position is transmitted to shared server 12. Receiving the information on the new position, shared server 12 identifies what objects (including avatars) are located inside aura 52 centered at the new position of avatar 51 and transmits information on the objects to the client PC of avatar 51. In the example shown in FIG. 7, since an object 54-1 is identified as an object located inside aura 52 centered at the new position of avatar 51 after the motion, shared server 12 transmits information on object 54-1 to the client PC of avatar 51. Receiving the information on object 54-1, the client PC of avatar 51 displays the picture of object 54-1, allowing the user of avatar 51 to visually recognize object 54-1.

If a large number of objects exist in the world (the virtual space), there may also be more objects located inside aura 52, increasing the amount of information to be received and processed. In order to prevent the amount of information to be received from exceeding what is really required, a maximum number of objects in an aura that can be visually recognized by the avatar of the aura is set in advance to be controlled by shared server 12. As a result, only information on a number of objects not exceeding the maximum number is transmitted. For example, assume that the maximum number of objects in aura 52 that can be visually recognized by avatar 51 is set at "2" and there are three or more objects located inside aura 52. In this case, only two objects that are included first or at temporally earlier are taken into account. That is, information on the third and subsequent objects included after the second object is not reported to avatar 51. The maximum number of objects in aura 52 that can be visually recognized by avatar 51 is set in advance at a value predetermined by, among other limiting factors, a limit on resources in the client PC for avatar 51 and a limit on a transmission band of a network between the client PC and shared server 12.

It should be noted, however, that the maximum number of objects in aura 52 that can be visually recognized by avatar 51 is a number of objects excluding AOs (application objects) moving autonomously in the world. Thus, avatar 51 is always capable of visually recognizing such an AO even if the number of objects included in aura 52 of avatar 51 has already reached the maximum.

By the same token, if a maximum limit is imposed on the number of objects in an aura that can be visually recognized by the avatar of the aura as described above, it is quite possible that the imposition of such a limit results in a state of mismatching, that is, a state in which the avatar of the aura is not capable of visually recognizing another avatar in spite of the fact that the other avatar is capable of visually recognizing the avatar of the aura.

Figure 8:
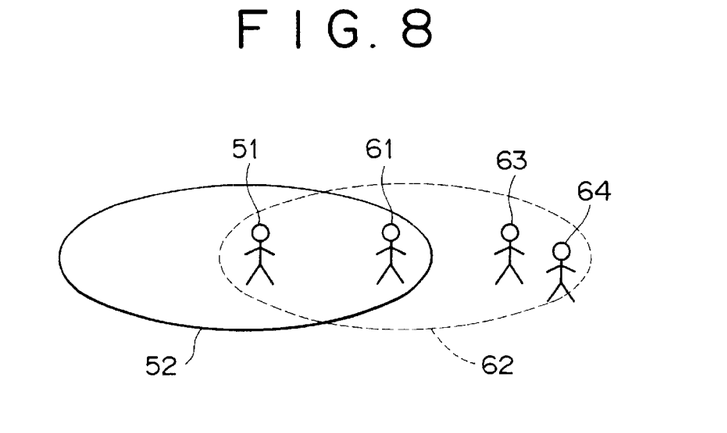
FIG. 8 is an explanatory diagram used for describing mismatching sensations by avatars.

A state of mismatching cited above is exemplified by the following case. Assume that an avatar 51 enters an aura 62 of an avatar 61 after avatars 63 and 64 have already been included in aura 62 as shown in FIG. 8. In this case, avatar 51 visually recognizes avatar 61 due to the fact that avatar 61 is the only avatar other than avatar 51 in an aura 52 of avatar 51. On the other hand, avatar 61 is not capable of visually recognizing avatar 51 due to the fact that, when avatar 51 enters aura 62, the maximum number of avatars that can be recognized by avatar 61 in aura 62 has been reached by the existence of the two other avatars 63 and 64 in aura 62. Thus, when third avatar 51 newly enters aura 62, the avatar count exceeds the maximum number "2", making avatar 61 incapable of visually recognizing avatar 51. As a result, avatar 61 is not capable of visually recognizing the other avatar 51 in spite of the fact that the other avatar 51 is capable of visually recognizing avatar 61. Thus, for example, avatar 51 is capable of requesting avatar 61 to have a chat with avatar 61 but avatar 61 is not capable of accepting the request made by avatar 51.

In order to avoid such a state of mismatching, the system is designed so that, if avatar 51 is capable of visually recognizing avatar 61, avatar 61 is also made capable of visually recognizing the newly entering avatar 51 even in a state in which the presence of avatar 51 causes the avatar count in aura 62 to exceed the maximum value thereof. It is thus possible to avoid a state of mismatching in which the avatar of the aura is not capable of visually recognizing another avatar in spite of the fact that the other avatar is capable of visually recognizing the avatar of the aura.

A plurality of auras can be set for an avatar or an object. By assigning a different role to each of the auras set for an avatar, the speed of processing can be increased. To put it concretely, two auras are set for one avatar for example as shown in FIG. 9.

In addition to an inner aura 52-1, an outer aura 52-2 is set for an avatar 51 to completely enclose inner aura 52-1 as shown in the figure. The auras 52-1 and 52-2 are dynamically shifted along with a movement of the aura 51 such that the positions of inner and outer auras 52-1, 52-2 remain substantially constant with respect to the position of avatar 51.

Figure 9:
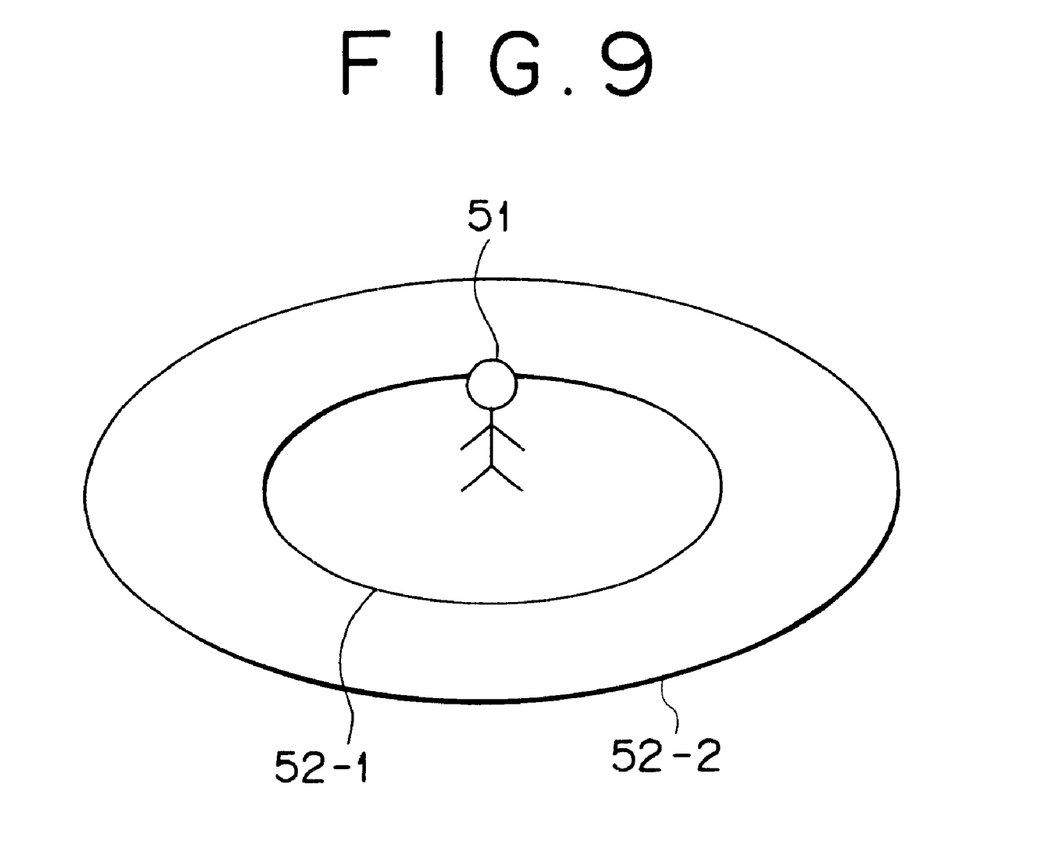
FIG. 9 is an explanatory diagram used for describing overlapping auras.
Figure 10:
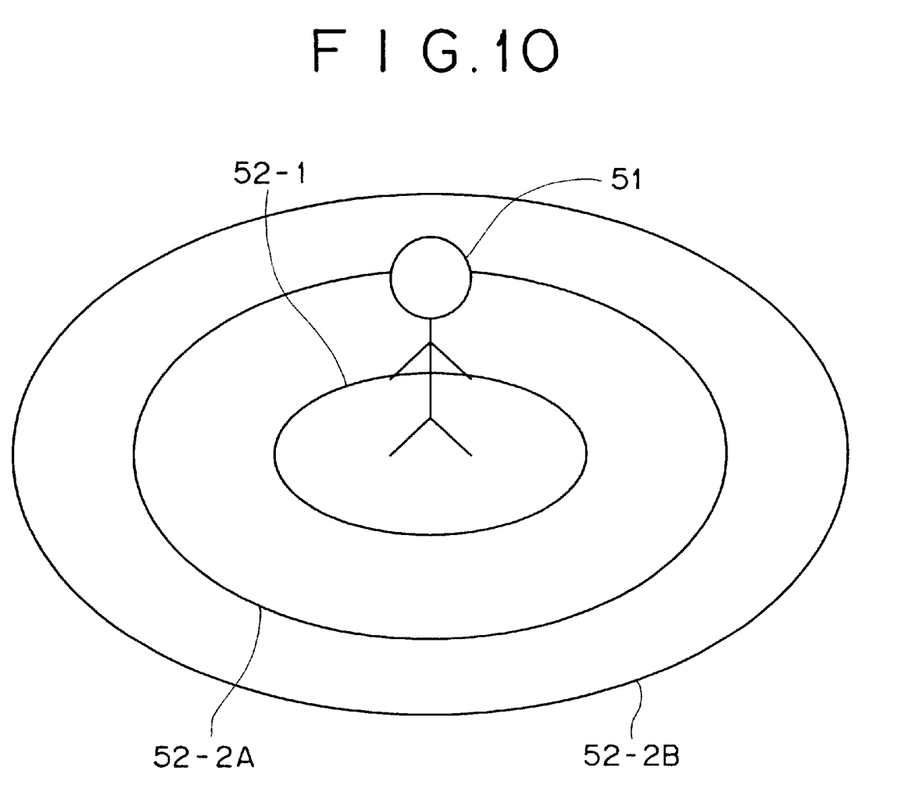
FIG. 10 is another explanatory diagram used for describing overlapping auras.

Moreover, as shown in FIG. 10, in accordance with the present invention, an outermost aura 52-2B can be further sent for avatar 51 such that outermost aura 52-2B completely encloses outer aura 52-2A and inner aura 52-1. Moreover, as with the embodiment shown in FIG. 9, inner aura 52-1, outer aura 52-2A, and outermost aura 52-2B are configured to dynamically move along with the movement of avatar 51 in the virtual shared space such that the positions of inner, outer and outermost auras 52-1, 52-2A, 52-2B remain substantially constant with respect to the position of avatar 51.

Figure 11:
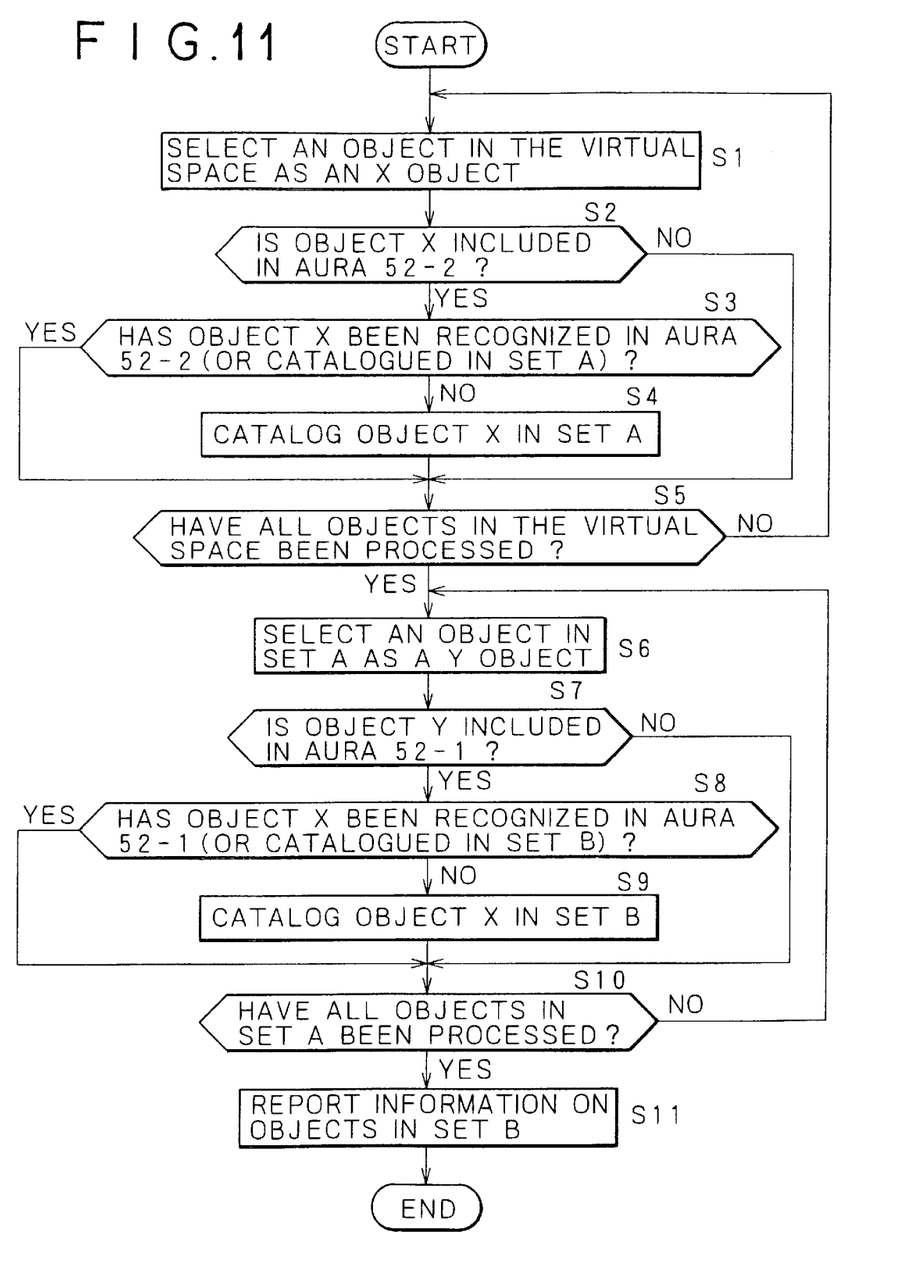
FIG. 11 shows a flowchart representing the operation of a shared server.

FIG. 11 is a flowchart representing processing which is carried out by shared server 12 to detect objects existing in auras 52-1 and 52-2 as shown in FIG. 9 when avatar 51 enclosed by the auras 52-1 and 52-2 moves.

As shown in FIG. 11, the flowchart begins with step S1 where an object in the virtual space is selected. Let an object X be the selected object. The flow of the processing then goes on to step S2 to determine whether the object X is located inside outer aura 52-2. The determination is made by computing the distance between avatar 51 and the object X from the coordinates of avatar 51 and the object X, and then comparing the distance with the diameter of aura 52-2.

If the outcome of the determination made at step S2 indicates that the object X is not included in aura 52-2, the flow of the processing goes to step S5. On the other hand, if the outcome of the judgment made at step S2 indicates that the object X is included in aura 52-2, the flow of the processing goes on to step S3 to determine whether the object X has already been recognized as an object in outer aura 52-2. That is, a determination is made as to whether the object X is included in a set A stored in shared server 12, where the set A is a set of objects each having already been recognized as an object in outer aura 52-2.

If the outcome of the determination made at step S3 indicates that the object X is not included in the set A, the flow of the processing goes on to step S4 where shared server 12 adds the object X to set A. The flow of the processing then goes on to step S5. On the other hand, if the outcome of the determination made at step S3 indicates that the object X is included in set A, the flow of the processing goes to step S5 directly, bypassing the operation of step S4 since it is not necessary to newly catalog the object X in set A.

At step S5, shared server 12 determines whether the various processes above have been carried out on all objects existing in the virtual space. If the outcome of the determination indicates that the various processes have not been carried out on all objects existing in the virtual space, the flow of the processing returns to step S1 to repeat the processing starting with step S1. On the other hand, if the outcome of the determination indicates that the various processes above have been carried out on all objects existing in the virtual space, the flow of the processing goes on to step S6.

At step S6, shared server 12 selects an object from the set A as an object Y. Then, the flow of the processing proceeds to step S7 to determine whether the object Y is included in inner aura 52-1.

If the outcome of the determination made at step S7 indicates that the object Y is not included in inner aura 52-1, the flow of the processing goes to step S10. On the other hand, if the outcome of the determination made at step S7 indicates that the object Y is included in inner aura 52-1, the flow of the processing goes on to step SS to determine whether the object Y has already been recognized as an object in inner aura 52-1. That is, a determination is made as to whether the object Y is included in a set B stored in shared server 12, where set B is a set of objects each having already been recognized as an object in inner aura 52-1.

If the outcome of the determination made at step S8 indicates that object Y is not included (catalogued) in set B, the flow of the processing goes on to step S9 where shared server 12 adds the object Y to the set B. The flow of the processing then goes on to step S10. On the other hand, if the outcome of the determination made at step S8 indicates that the object Y is included in set B, the flow of the processing goes on to step S10 directly, bypassing the operation of step S9 since it is not necessary to newly catalog object Y in set B.

At step S10, shared server 12 determines whether the various processes above have been carried out on all objects existing in set A. If the outcome of the determination indicates that the various processes have not been carried out on all objects existing in set A, the flow of the processing goes back to step S6 to repeat the processing starting with step S6. On the other hand, if the outcome of the determination indicates that the above processes have been carried out on all objects existing in the set A, the flow of the processing goes on to step S11. At step S11, information indicating what objects are catalogued in set B is reported to avatar 51.

It should be noted that, while the above description explains processing carried out on objects, the same processing is carried out also on avatars other than avatar 51. As a result, information indicating what objects are catalogued in set B is reported to avatar 51. That is, an avatar is regarded as a kind of object and is subjected to the same processing as an object.

As described above, by limiting information on objects to be reported to avatar 51 to objects detected in outer aura 52-2 instead of taking all objects existing in the virtual space into consideration, that is, by starting the processing with only objects catalogued in set A at step S8 instead of all objects existing in the virtual space at step S1 as described above, processing can be carried out in a period of time shorter than a case where all objects existing in the virtual space are detected and information on such objects is reported.

It should be noted that, while the above description explains a case in which two auras are set for one avatar, three or more auras can also be set for an avatar as shown in FIG. 10. Indeed, referring back to FIG. 10, avatar 51 is surrounded by inner aura 52-1, while the inner aura 52-1 is surrounded by outer aura 52-1A, and furthermore, the outer aura 52-2A is surrounded by outermost aura 52-2B. Similar to the processing as described above with respect to FIG. 11, in the case shown in FIG. 10, additional steps similar to steps S1 to S5 of FIG. 11 are provided to take into account of outermost aura 52-2B. Moreover, in this case, in addition to the auras used for sensing visual and auditory attributes as discussed above, a further attribute of the avatars can be used to detect avatars that are within the boundaries of the auras. Such attributes can include olfactory attributes such as scent, tactile attributes such as physical contact, environmental attributes such as temperature, or other interactive attributes between avatars such as a handshake or other physical contact, exchange of items and so on.

In addition, the two auras set for an avatar can be an aura for sensing visible attributes of an object such as the shape and the color of the object (or an aura having something to do with the sense of sight) and an aura for sensing sound (or an aura having something to do with the sense of hearing). By setting an aura for the sense of sight and an aura for the sense of hearing in this manner, for example, a vessel existing at a remote location is visually undetectable by the inner aura based on the sense of sight, but can be sensed by the outer aura based on the sense of hearing. In this case, a whistle of the vessel can be heard by the user and, if the user has an interest in the vessel that generated the whistle sound, the avatar can be moved in a direction toward the whistle until the vessel is sensed by the inner aura based on the sense of sight, in which case the user is capable of seeing the vessel.

Accordingly, as discussed above, in accordance with the present invention, given an object in virtual shared space, an inner sensing area (an inner aura) and an outer sensing area (an outer aura) for sensing another object are set with the outer aura enclosing the inner aura which further encloses the object, wherein only if the other object sensed by the outer aura also exists in the inner area, is the processing carried out on the other object. Therefore, the amount of information reported to the object is reduced and the information is processed in a shorter period of time.

It should be noted a computer program to be executed to carry out the processing described above is presented to the user through presentation media which can be network presentation media such as the Internet and a digital satellite or information recording media such as a CD-ROM and a magnetic disc.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An information processing apparatus for moving an object located in a 3-dimensional virtual space, comprising:
   recognition means for recognizing a second object existing in an outer sensing area of a first object used for sensing said second object and set to enclose an inner sensing area, said inner sensing area configured to enclose said first object;
   judgment means for determining whether said recognized second object exists in said inner sensing area; and
   processing means for carrying out a predetermined processing on said second object determined to exist in said inner sensing area.

2. The apparatus of claim 1 wherein one of said outer and inner sensing areas is a sensing area configured to sense said object in accordance with a sound, and wherein said other one of said outer and inner sensing areas is a sensing area configured to sense visually.

3. The apparatus of claim 1 wherein said recognition means recognizes said second object based on a position of said second object relative to said first object.

4. The apparatus of claim 1 wherein either of said inner or outer sensing area includes a plurality of sub-sensing areas.

5. The apparatus of claim 1 wherein said first and second objects are first and second avatars, respectively in said 3-dimensional virtual space, and further, wherein said inner and outer sensing areas of said first avatar are an inner and outer auras, respectively.

6. The apparatus of claim 5 wherein each of said first and second avatars correspond to a first and second users, respectively.

7. The apparatus of claim 1 wherein said first and second sensing areas have a corresponding predetermined shape.

8. The apparatus of claim 7 wherein said predetermined shapes of said first and second sensing areas are different.

9. The apparatus of claim 7 wherein said predetermined shapes of said first and second sensing areas are the same.

10. The apparatus of claim 7 wherein said predetermined shapes of said first and second sensing areas are substantially spherical.

11. An information processing method for moving an object located in a 3-dimensional virtual space, said method comprising the steps of:
    recognizing a second object existing in an outer sensing area of a first object used for sensing said second object and set to enclose an inner sensing area set to enclose said second object;
    determining whether said recognized second object exists in said inner sensing area; and
    performing a predetermined processing on said second object determined to exist in said inner sensing area.

12. The method of claim 11 wherein said recognizing step recognizes said second object based on a position of said second object relative to said first object.

13. The method of claim 11 wherein either of said inner or outer sensing area includes a plurality of sub-sensing areas.

14. The method of claim 11 wherein said first and second objects are first and second avatars, respectively in said 3-dimensional virtual space, and further, wherein said inner and outer sensing areas of said first avatar are an inner and outer auras, respectively.

15. The method of claim 14 wherein each of said first and second avatars correspond to a first and second users, respectively.

16. The method of claim 11 wherein said first and second sensing areas have a corresponding predetermined shape.

17. The method of claim 16 wherein said predetermined shapes of said first and second sensing areas are different.

18. The method of claim 16 wherein said predetermined shapes of said first and second sensing areas are the same.

19. The method of claim 16 wherein said predetermined shapes of said first and second sensing areas are substantially spherical.

20. A presentation medium for a presenting a program that can be executed by a computer to drive an information processing apparatus for moving an object located in a 3-dimensional virtual space to carry out processing including:
    a recognition step of recognizing a second object existing in an outer sensing area of a first object used for sensing said second object and set to enclose an inner sensing area, said inner sensing area configured to enclose said first object;
    a judgment step of determining whether said second recognized object exists in said inner sensing area; and
    a processing step of performing a predetermined processing on said second object determined to exist in said inner sensing area.

21. The medium of claim 20 wherein said recognizing step recognizes said second object based on a position of said second object relative to said first object.

22. The medium of claim 20 wherein either of said inner or outer sensing area includes a plurality of sub-sensing areas.

23. The medium of claim 20 wherein said first and second objects are first and second avatars, respectively in said 3-dimensional virtual space, and further, wherein said inner and outer sensing areas of said first avatar are an inner and outer auras, respectively.

24. The medium of claim 23 wherein each of said first and second avatars correspond to a first and second users, respectively.

25. The medium of claim 20 wherein said first and second sensing areas have a corresponding predetermined shape.

26. The medium of claim 25 wherein said predetermined shapes of said first and second sensing areas are different.

27. The medium of claim 25 wherein said predetermined shapes of said first and second sensing areas are the same.

28. The medium of claim 25 wherein said predetermined shapes of said first and second sensing areas are substantially spherical.

29. An information processing apparatus for moving an object located in a 3-dimensional virtual space, comprising:
- a browser for executing a script program to process a VRML file including an inner sensing area and an outer sensing area, said inner sensing area configured to enclose a first object and said outer sensing area including a second object; and
- a server for determining whether said recognized second object exists in said inner sensing area;
  - wherein said server is configured to perform a predetermined processing on said second object determined to exist in said inner sensing area.

30. The apparatus of claim 29 wherein one of said outer and inner sensing areas is a sensing area configured to sense said object in accordance with a sound, and wherein said other one of said outer and inner sensing areas is a sensing area configured to sense visually.

31. The apparatus of claim 29 wherein said server is configured to recognize said second object based on a position of said second object relative to said first object.

32. The apparatus of claim 29 wherein either of said inner or outer sensing area includes a plurality of sub-sensing areas.

33. The apparatus of claim 29 wherein said first and second objects are first and second avatars, respectively in said 3-dimensional virtual space, and further, wherein said inner and outer sensing areas of said first avatar are an inner and outer auras, respectively.

34. The apparatus of claim 33 wherein each of said first and second avatars correspond to a first and second users, respectively.

35. The apparatus of claim 29 wherein said first and second sensing areas have a corresponding predetermined shape.

36. The apparatus of claim 35 wherein said predetermined shapes of said first and second sensing areas are different.

37. The apparatus of claim 35 wherein said predetermined shapes of said first and second sensing areas are the same.

38. The apparatus of claim 35 wherein said predetermined shapes of said first and second sensing areas are substantially spherical.

39. The apparatus of claim 29 wherein said predetermined processing includes processing for receiving information from said second object.

40. An information processing system for a 3-dimensional virtual shared space, comprising:
- a user terminal having a browser loaded therein to execute a script program stored in a storage medium for processing a VRML file, said VRML file including an inner aura and an outer aura, said inner aura configured to enclose a first avatar and said outer aura including a second avatar;
- a shared server coupled to said user terminal for determining whether said recognized second avatar exists in said inner aura;
  - wherein said shared server is configured to receive information from said second avatar wherein said second avatar is determined to exist in said inner aura.

41. The apparatus of claim 40 wherein each of said inner and outer avatars has a predetermined detection range.

42. The apparatus of claim 41 wherein one of said inner and outer auras is an aura configured to detect one or more avatars within its detection range in accordance with a sound, and wherein said other one of said inner and outer auras is an aura configured to visually detect one or more avatars within its corresponding detection range.

43. The apparatus of claim 40 wherein either of said inner or outer auras includes one or more sub-auras.

44. The apparatus of claim 43 wherein each of said sub-auras has a predetermined detection range.

45. The apparatus of claim 44 wherein said sub-aura is configured to detect one or more avatars within its detection range in accordance with a gesture from said one or more avatars.

46. The apparatus of claim 45 wherein said gesture includes one or more of a movement of an arm for a handshake, a movement to come into physical contact with said first avatar, or a movement to transfer an object.

47. The apparatus of claim 40 wherein said first avatar corresponds to a first user at said user terminal.

48. The apparatus of claim 40 wherein said first and second auras have a corresponding predetermined shape.

49. The apparatus of claim 48 wherein said predetermined shapes of said first and second auras are different.

50. The apparatus of claim 48 wherein said predetermined shapes of said first and second auras are the same.

51. The apparatus of claim 48 wherein said predetermined shapes of said first and second auras are substantially spherical.

* * * * *